Patented Apr. 25, 1950

2,505,627

UNITED STATES PATENT OFFICE 2,505,627

PROCESS OF CLEANING AND TINNING ELECTRICAL CONDUCTORS

Leopold Pessel, Philadelphia, Pa., assignor to Radio Corporation of America, a corporation of Delaware No Drawing. Application July 17, 1944, Serial No. 545,411

3 Claims. (Cl. 117—51)

The present invention relates to a soldering process and more particularly to a process of preparing a film-insulated surface for a solder connection.

Many present day current conducting wires are provided with an insulating coating consisting of certain types of synthetic resins or enamels; thus some wires are insulated with a film of synthetic resin embodying polyvinyl acetal, and others employ insulating film or coating produced by reacting formaldehyde with other polyvinyl derivatives. In films of this character or any resin or enamel coating, the film adheres so tenaciously to the wire and offers such resistance to removal that no practical methods have been devised heretofore for successfully removing the film in order to make well bonded connections and joints. Tests show that ninety per cent or more coil failures occur at or near the joints between the coil ends and the attaching leads. It has been proposed to carbonize the coating by means of an open flame and removal of the carbonized residue by means of wire brushing, but this has been found unsatisfactory because the wire becomes brittle, burned and damaged and is particularly unsuited for line wire sizes. Another tried method is to immerse the wire in hot solder for a brief period at a required temperature of not less than 500° C. This is supposed to decompose the insulating coating and cause it to act as a flux, thus tinning the conductor upon removal from the pot of solder. However, the high temperature required causes weakening of the wire, charring of adjoining insulation, and other deleterious results. Also, since the solder oxidizes rapidly at such high temperature, it has to be cleaned and renewed at frequent intervals.

While these are the two main methods now employed with unsatisfactory results and both based upon the use of high temperatures, there are certain chemical methods which have been tried also without success. For example, wires have been dipped in molten caustic soda or in hot concentrated acids, such as pyrophosphoric acid kept at a temperature of 200° to 250° C. While these chemical treatments remove the insulation, the chemical residues cause corrosion and sources of current leakage due to the failure of washing to remove residues absorbed in the adjoining section of the remaining coating.

Some of the objects of the present invention are to provide an improved method of making solder connections on film surfaces insulated with certain types of synthetic resins or enamels; to provide a method of making solder connections on insulated wires without causing damage to the wire; to provide a novel method of removing insulation from a wire to produce a clean soldered surface for electrical connections; to provide a method of removing insulation from a wire so as to eliminate chance of corrosion, charring of the remaining insulation, and other deleterious results now common in present methods; and to provide other improvements as will hereinafter appear.

In accordance with the present invention, the surface from which the insulation is to be removed is subjected to a solubilizing treatment to render the film soluble in some readily applied solvent which removes the solubilized film. In some instances, depending upon the solvent, the solubilized film is allowed to remain to serve as a flux during the soldering operation. In either case, the solvent treated wire is brought into contact with molten solder, which may be done with or without the additional application of any of the fluxing materials known in the art. In explanation of the method, the case of polyvinyl acetal coated wire may be taken as illustrative. The solubilizing treatment is based upon immersing the wire in some organic compound which, at the elevated temperature used, changes the nature of the insulating film in such a manner that it becomes readily soluble in acetone, alcohol or similar solvent. The effective temperature at which the solubilizing agent is held and the time of immersion varies with the nature of the agent. However, the temperature is almost always considerably above room temperature, at least 100° C. or above. With most solubilizing agents, temperature ranges of 150° to 200° C. have been found effective, although in some cases considerably higher temperatures have to be used. The criterion of "effectiveness" is also linked with the time factor and the latter in turn is affected by the manufacturing and production conditions under which the process is to be used. In the production tinning of polyvinyl acetal coated wire, the solubilizing treatment should preferably not require more than a few seconds in order to be classed "effective." This inter-relation of temperature, time, and manufacturing requirements prevents a sharp definition of the time and temperature factors.

Time and temperature of the solubilizing treatment are also governed by the thickness of wire and coating and by the presence of other parts of an assembly which is to be tinned or soldered simultaneously with the polyvinyl acetal coated wire.

There is a sharp practical distinction between the solubilization step of this invention and treatment with a solvent on the one hand, or with a flux on the other hand, which are well known. The solubilization treatment, in the brief time allotted to it, does not dissolve or remove the film, but it changes its chemical or physical nature in such a manner that it can be readily dissolved by a solvent after such treatment. The solubilizing agent, in most casts, has no fluxing effect, but it may modify the residue of the insulating film in such a manner that its self-fluxing properties are brought out. There are cases, however, where the solubilizing agent itself has fluxing properties and if there is such coincidence between solubilizing and fluxing activity, this composite function of the solubilization step shall be a part of this invention.

The mechanism of the solubilization process appears to be very complex, which is obvious in view of the complicated physical and chemical nature of the insulating films. It is probably based upon a combination of chemical action with plasticizing and solvent action. While the exact nature of the chemical reactions involved is not known at the present, their existence may be surmised from the relative effect of reactive groups in the solubilizing agent upon its solubilizing efficiency.

A considerable number of organic materials have been found suitable as solubilizing agents. The ones described below are typical for this effect, but the inventive feature of the solubilizing treatment is not to be restricted to the materials or group of materials actually enumerated.

Generally speaking, hydrocarbons have only negligible solubilizing effect. The introduction of one hydroxyl group affects the solubilizing effectiveness but little.

However, the introduction of more than one hydroxyl group, or of other active groups such as double or multiple carbon linkages, or groups including elements other than C or H, such as O, N, S, P, greatly increases the solubilizing effectiveness of the material.

The following are a number of classes of materials having pronounced solubilizing effect with representative examples, but neither classes nor examples are intended to be exclusive:

1. *Organic dihydroxy or polyhydroxy compounds.*—Examples of such compounds of the aliphatic series are the glycols, such as ethylene glycol, diethylene glycol, and the various polyethylene glycols including the wax-like materials falling within this class. Other examples are trihydric alcohols, such as glycerin, and higher polyhydric alcohols.

Examples of hydroxy-compounds of the aromatic series are the phenols, especially the dihydric and trihydric phenols, such as resorcinol, hydroquinone, pyrogallol, phloroglucinol. Other examples are hydroxy derivatives of condensed ring compounds such as those of naphthalene or anthracene, such as naphthalenediol or anthracenediol.

2. *Compounds containing the C=O group.*—Examples are 1-2-5-8 tetrahydroxy-anthraquinone, and dehydroacetic acid, 2-hydroxy-6-methyl-3-acetyl-gamma-pyrone.

3. *Aldehydes*—Examples are benzaldehyde, salicyl aldehyde, furfural.

4. *Dibasic or polybasic organic acids and their anhydrides.*—This includes those esters of such acids which are slightly unstable at the temperature used for solubilization. Examples are phthalic acid, phthalic anhydride, diphenyl phthalate, glyceryl phthalate.

5. *Compounds containing a carbon-nitrogen bond.*—Particularly effective solubilizing agents are acid amides, hydroamides, oximes. Examples are furfuramide, benzoin oxime.

6. *Other types of nitrogen containing carbon compounds in which the nitrogen is linked to an element other than carbon.*—Examples are benzene sulfamide, toluene sulfonamide.

7. *Compounds containing S, P, or other elements other than O or H linked directly to carbon.*—Examples are thioanilide, phosphorus thioanilide, phenyl phosphinic acid, phenyl phosphine sulfide.

Two specific embodiments of the invention are now described:

(A) Stranded polyvinyl acetal coated wire with 6–.0025" components is dipped into molten furfuramide $(C_5H_4O)_3N_2$ maintained at a temperature of 200° C. After five seconds it is removed and washed in acetone. It is then dipped into alcoholic rosin solution and immediately following into a solder pot containing 60-40 solder at a temperature of about 230° C.

(B) A solder connection between a single strand "Formex" wire of about 0.0025" thickness and a tinned copper wire is produced in the following manner. In this case, the solubilizing treatment assumes also the role of a fluxing treatment:

An assembly is produced by winding an end of the polyvinyl acetal coated wire around the tinned wire. The assembled portion is dipped for about two seconds in molten pyrogallol held at a temperature of 200° C., and then immediately into a solder pot containing 60-40 solder at 250° C.

From the two embodiments described, the application of this process to other types of insulated wire or film-insulated surfaces and the advantages accruing therefrom become obvious. The wires are not subjected to high temperatures or severe mechanical action and there are no corrosive residues after the solder operation. The operation carried out in accordance with this process is extremely simple and rapid and leads to sound tinning and solder joints.

What is claimed is:

1. The process of tinning the surface of a metallic electrical conductor insulated with a film of acetone-insoluble polyvinyl acetal synthetic resin which comprises treating said film with molten pyrogallol and then immediately thereafter applying molten solder to the treated film.

2. The process of cleaning the surface of a metallic electrical conductor insulated with a film of an acetone-insoluble polyvinyl acetal resin which comprises treating said film with a solubilizing agent comprising a polyhydroxy compound maintained at an elevated temperature whereby said polyvinyl resin film is rendered acetone-soluble, and removing said treated film by washing with acetone, said entire process being completed in a period of time of the order of a few seconds.

3. The process of claim 2 in which said polyhydroxy compound is pyrogallol.

LEOPOLD PESSEL.

REFERENCES CITED

The following references are of record in the file of this patent:

UNITED STATES PATENTS

| Number | Name | Date |
| --- | --- | --- |
| 486,496 | Norton | Nov. 22, 1892 |
| 1,185,641 | Ellis | June 6, 1916 |
| 1,339,710 | Page | May 11, 1920 |
| 1,653,805 | Housekeeper | Dec. 27, 1927 |
| 1,726,623 | Hollnagel | Sept. 3, 1929 |
| 2,085,995 | Patnode | July 6, 1937 |
| 2,154,057 | Thielking | Apr. 11, 1939 |

OTHER REFERENCES

Simonds: "Handbook of Plastics," pages 42 and 43, D. Van Nostrand Co. Inc., New York, 1943.